(12) United States Patent
Kim et al.

(10) Patent No.: US 6,980,413 B1
(45) Date of Patent: Dec. 27, 2005

(54) THIN FILM MULTI-LAYERED CERAMIC CAPACITOR AND METHOD OF MANUFACTURING THE SAME

(75) Inventors: Jeong Wook Kim, Kyungki-do (KR); Cheol Seong Hwang, Kyungki-do (KR); Kang Heon Hur, Kyungki-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 11/092,544

(22) Filed: Mar. 29, 2005

(30) Foreign Application Priority Data

Jul. 23, 2004 (KR) ...................... 10-2004-0057488

(51) Int. Cl.[7] .................... H01G 4/005; H01G 4/228; H01G 4/06
(52) U.S. Cl. ................. 361/303; 361/306.3; 361/308.1; 361/311; 29/25.42
(58) Field of Search ..................... 361/301.4, 303–305, 361/306.1, 306.3, 308.1, 308.2, 308.3, 309, 361/311–312, 320; 29/25.42

(56) References Cited

U.S. PATENT DOCUMENTS

| | | | | |
|---|---|---|---|---|
| 3,400,312 | A | * 9/1968 | Dornfeld | ..................... 361/325 |
| 5,072,329 | A | * 12/1991 | Galvagni | ................. 361/321.2 |
| 6,421,224 | B1 | 7/2002 | Lin et al. | |
| 6,503,791 | B2 | 1/2003 | Matsui et al. | |
| 6,798,642 | B2 * | 9/2004 | Decker et al. | .............. 361/311 |
| 2001/0008479 | A1 * | 7/2001 | Branchevsky | ............. 361/306.3 |

FOREIGN PATENT DOCUMENTS

JP 2001-181839 7/2001

* cited by examiner

*Primary Examiner*—Eric W. Thomas
(74) *Attorney, Agent, or Firm*—Volpe and Koenig, P.C

(57) ABSTRACT

The present invention provides a thin film type multi-layered ceramic capacitor including a stacked body composed of a plurality of capacitor layers. Each of the capacitor layers comprises a substrate having an upper surface where a plurality of holes are formed and a flat lower surface, and a thin film capacitor on the upper surface of the substrate. The thin film capacitor includes a lower electrode film, a dielectric film, and an upper electrode film. The lower electrode film, the dielectric film, and the upper electrode film are formed in sequence on the upper surface of the substrate. The lower and the upper electrode films extend to one side and the other side of the substrate and contact first and second external electrodes, respectively.

28 Claims, 10 Drawing Sheets

THIN FILM MULTI-LAYERED CERAMIC CAPACITOR AND METHOD OF MANUFACTURING THE SAME

RELATED APPLICATION

The present application is based on, and claims priority from, Korean Application No. 2004-57488, filed on Jul. 23, 2004, the disclosure of which is incorporated by reference herein in its entirety.

BACKGROUND OF THE INVENTION

1. Field of the Invention

The present invention relates to a multi-layered ceramic capacitor, and more particularly to a thin film type multi-layered ceramic capacitor that can be miniaturized with high electrostatic capacity. Also, the present invention relates to a method of manufacturing the same.

2. Description of the Related Art

Generally, a multi-layered ceramic capacitor is a chip type capacitor having a plurality of stacked dielectric layers with electrodes printed thereon, which is widely used in electronic products. As the market for mobile communication devices and portable electronic devices expands, it is necessary that the size of the multi-layered ceramic capacitor be decreased and the capacity of the multi-layered ceramic capacitor be increased.

The conventional multi-layered ceramic capacitor is manufactured by stacking a plurality of green sheets with electrode paste applied thereto to form a stacked body and forming side electrodes at both sides thereof. With the above-mentioned bulk process, however, decrease of the size of the multi-layered ceramic capacitor and increase of the capacity of the multi-layered ceramic capacitor are limited.

In order to solve the above-mentioned problem, a brisk study of introducing a semiconductor thin film process has been made in the current multi-layered ceramic capacitor application. For example, a method of manufacturing a multi-layered ceramic capacitor has been proposed that is capable of depositing a $(Ba,Sr)TiO_3$ film with high permittivity through the use of metal organic chemical vapor deposition (MOCVD), which is disclosed in Japanese Unexamined Patent Publication No. 2001-181839. FIG. 1 is a side view, in section, showing a conventional thin film type multi-layered ceramic capacitor manufactured using the above-mentioned manufacturing method.

As shown in FIG. 1, the conventional thin film type multi-layered ceramic capacitor comprises Pt electrode films 12 and 16 deposited on a substrate 11, such as MgO, through repetitive execution of a sputtering process, and a BST dielectric film 14 deposited on the substrate 11 through repetitive execution of metal organic chemical vapor deposition. The electrode films and the dielectric film are deposited through the sputtering process and the metal organic chemical vapor deposition, respectively, and the respective films are patterned through a photolithographic process and an etching process as shown in FIG. 1. In this way, the multi-layered ceramic capacitor is manufactured.

However, the conventional thin film type multi-layered ceramic capacitor is formed on the upper surface of the substrate, which is very limited. As a result, the effective area, which decides the electrostatic capacity, is limited. For this reason, the stacking process must be repetitively carried out to obtain high electrostatic capacity. Consequently, the photolithographic process and the etching process are increased, which complicates the overall process.

As described above, the conventional thin film type multi-layered ceramic capacitor has difficulty in obtaining high electrostatic capacity, for example, more than 10 $\mu F$, due to the limitation caused from the structure of the flat board.

A micro-structured capacitor using an SOI (silicon on insulator) substrate is also disclosed in U.S. Pat. No. 6,421,224, in which upper and lower silicon layers are etched using an insulating layer as an etching stop layer to provide uniform porosity to upper and lower silicon layers, and a dielectric film and a metal layer are formed on the etched upper and lower surfaces of the silicon layers to provide a three-dimensional micro-structured capacitor. A plurality of such micro-structured capacitors are stacked to provide a miniaturized capacitor with high electrostatic capacity. The micro-structured capacitor has the effect of increasing surface area through the porous structure and obtaining high electrostatic capacity through the stacked structure. However, the remaining silicon layer and the insulating layer, which is used as the etching stop layer, are left between upper and lower electrodes in addition to the dielectric film. As a result, the performance of the capacitor may be decreased. Also, the construction of input and output terminals is very complicated in the stacking structure.

Also, a method of manufacturing a semiconductor device including a plurality of memory cells wherein a plurality of holes are formed, and a thin film capacitor is formed at the surface where the holes are formed, is disclosed in U.S. Pat. No. 6,503,791. However, Pat '791 relates to a method of manufacturing a capacitor cell structure integrated into the semiconductor device, not to a method of manufacturing a single high-capacity capacitor.

SUMMARY OF THE INVENTION

Therefore, the present invention has been made in view of the above problems, and it is an object of the present invention to provide a thin film type multi-layered ceramic capacitor that is manufactured by stacking a plurality of thin film capacitors with effective surface area increased through a plurality of holes and connecting the stacked thin film capacitors in parallel, whereby the thin film type multi-layered ceramic capacitor is miniaturized with high electrostatic capacity.

It is another object of the present invention to provide a method of manufacturing the thin film type multi-layered ceramic capacitor through the use of a semiconductor thin film process.

In accordance with one aspect of the present invention, the above and other objects can be accomplished by the provision of a thin film type multi-layered ceramic capacitor comprising: a stacked body composed of a plurality of capacitor layers, each of the capacitor layers including a substrate having an upper surface where a plurality of holes are formed and a flat lower surface, and a thin film capacitor disposed on the upper surface of the substrate, the thin film capacitor having a lower electrode film, a dielectric film, and an upper electrode film, the lower electrode film, the dielectric film, and the upper electrode film being formed in sequence on the upper surface of the substrate, the lower electrode film extending to one side of the substrate, the upper electrode film extending to the other side of the substrate; a first external electrode formed at one side of the stacked body for contacting the lower electrode films of the respective capacitor layers; and a second external electrode formed at the other side of the stacked body for contacting the upper electrode films of the respective capacitor layers.

Preferably, the substrate is provided at both sides thereof with step parts such that the first and the second external electrodes can be firmly attached to the sides of the substrate.

Also, each of the capacitor layers further comprises: a passivation layer formed on the upper surface of the thin film capacitor, the passivation layer having a flat upper surface, such that the thin film capacitor can be protected and the flatness of the upper surface of the thin film capacitor can be improved.

The plurality of holes have the same depth, and, in this case, the substrate is provided at both sides thereof with step parts, the step parts having the same height as the bottom surfaces of the holes.

The plurality of holes are provided for increasing the surface area of the upper surface of the substrate, the holes may be hemispherical grains, pin-type holes, or cylinders.

Preferably, each of the holes has an aspect ratio of one or more to increase the surface area of the upper surface of the substrate, and each of the holes has an aspect ratio of 50 or less considering the limit of coating applied to the inner surfaces of the holes when the electrode films or the dielectric film is formed.

At least one of the upper and lower electrode films is made of at least one metal selected from the group consisting of Pt, Ru, Ir, Au, Ni, Mo, W, Al, Ta and Ti, or a conductive oxide or nitride including the metal.

Also, the dielectric film is made of a high dielectric material selected from the group consisting of $TiO_2$, $ZrO_2$, $HfO_2$, $SrTiO_3$, $BaTiO_3$, $(Ba,Sr)TiO_3$, $PbTiO_3$ and $Pb(Zr,Ti)O_3$.

The plurality of capacitor layers constituting the stacked body are bonded with each other by means of a thermo-hardening bonding agent, an ultraviolet-hardening bonding agent, and the composite thereof. When the thermo-hardening bonding agent is used, a bonding agent that can be hardened at a temperature of 100° C. or less is preferably used considering deterioration of the dielectric film at high temperatures.

In accordance with another aspect of the present invention, there is provided a method of manufacturing a thin film type multi-layered ceramic capacitor, the method comprising the steps of: forming a plurality of capacitor layers, each of the capacitor layers including a substrate having an upper surface where a plurality of holes are formed and a flat lower surface, a thin film capacitor disposed on the upper surface of the substrate, the thin film capacitor comprising a lower electrode film, a dielectric film, and an upper electrode film, the lower electrode film, the dielectric film, and the upper electrode film being formed in sequence on the upper surface of the substrate, the lower electrode film extending to one side of the substrate, the upper electrode film extending to the other side of the substrate; stacking the plurality of capacitor layers such that the lower surface of one of the capacitor layers is bonded to the upper surface of another capacitor layer to form a stacked body; and forming a first external electrode formed at one side of the stacked body for contacting the lower electrode films of the respective capacitor layers and a second external electrode formed at the other side of the stacked body for contacting the upper electrode films of the respective capacitor layers.

In a preferred embodiment of the present invention, the step of forming the plurality of capacitor layers comprises the sub-steps of: preparing a substrate having upper and lower surfaces; forming a plurality of holes on the substrate to increase the surface area of the upper surface of the substrate; forming a lower electrode film on the upper surface of the substrate including the inner surfaces of the plurality of holes, the lower electrode film extending to one side of the substrate; forming a dielectric film on the lower electrode film disposed on the upper surface of the substrate; and forming an upper electrode film on the upper surface of the dielectric film, the upper electrode film extending to the other side of the substrate.

Preferably, the step of forming the plurality of holes comprises the sub-steps of: forming the plurality of holes with the same depth; and forming step parts having the same height as the bottom surfaces of the holes at both sides of the substrate.

The step of forming the lower electrode film comprises the sub-steps of: depositing an electrode material on the upper surface of the substrate and at the both sides of the substrate; and etching the electrode material deposited at the other side of the substrate and on the upper surface of the substrate adjacent to the other side of the substrate to form the lower electrode film. Similarly, the step of forming the upper electrode film comprises the sub-steps of: depositing an electrode material on the upper surface of the substrate where the dielectric film is formed and at the both sides of the substrate; and removing the electrode material deposited at one side of the substrate and on the upper surface of the substrate adjacent to one side of the substrate to form the upper electrode film.

The step of forming the lower electrode film and the step of forming the upper electrode film are carried out by means of chemical vapor deposition (CVD) or atomic layer deposition (ALD).

Preferably, the step of forming the plurality of capacitor layers further comprises the sub-step of: forming passivation layers on the upper surfaces of the capacitor layers, respectively, such that the upper surfaces of the capacitor layers can be flattened. The passivation layers are formed on the upper surfaces and sides of the plurality of capacitor layers, and the method further comprises the step of: after the stacked body is formed and before the first and second external electrodes are formed, selectively removing the passivation layers such that the upper and lower electrode films disposed at both sides of the stacked body are exposed.

The step of forming the plurality of capacitor layers may further comprise the sub-step of: grinding the lower surfaces of the substrates to decrease the thickness of the capacitor layers, if necessary, whereby final products are more miniaturized.

The manufacturing method according to the present invention may be carried out at the wafer level. The step of forming the plurality of capacitor layers further comprises the sub-step of: forming a plurality of wafers each having at least one capacitor layer formed thereon at the wafer level. The plurality of wafers are used as the substrates of the capacitor layers. The plurality of wafers have the same size, and each of the wafers has at least one capacitor layer arranged in the same pattern. The step of forming the stacked body comprises the sub-steps of: stacking the plurality of wafers each having at least one capacitor layer formed thereon; and cutting the stacked wafers to obtain at least one multi-layered ceramic capacitor body. Consequently, the plurality of thin film type multi-layered ceramic capacitor layers can be manufactured in large quantities.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the accompanying drawings.

FIGS. 2A to 2F are sectional views illustrating a process of manufacturing a capacitor layer according to a preferred embodiment of the present invention.

Figure 1:
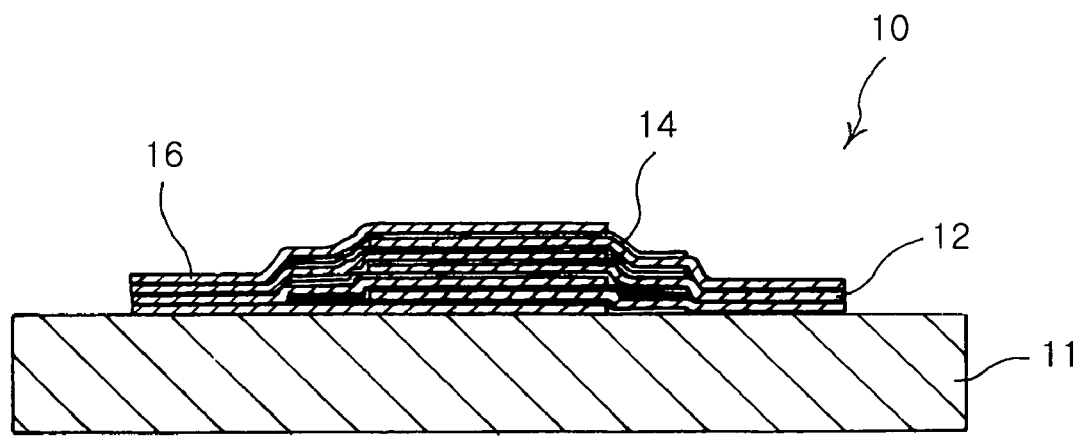
FIG. 1 is a side view, in section, showing a conventional thin film type multi-layered ceramic capacitor.
Figure 2A:
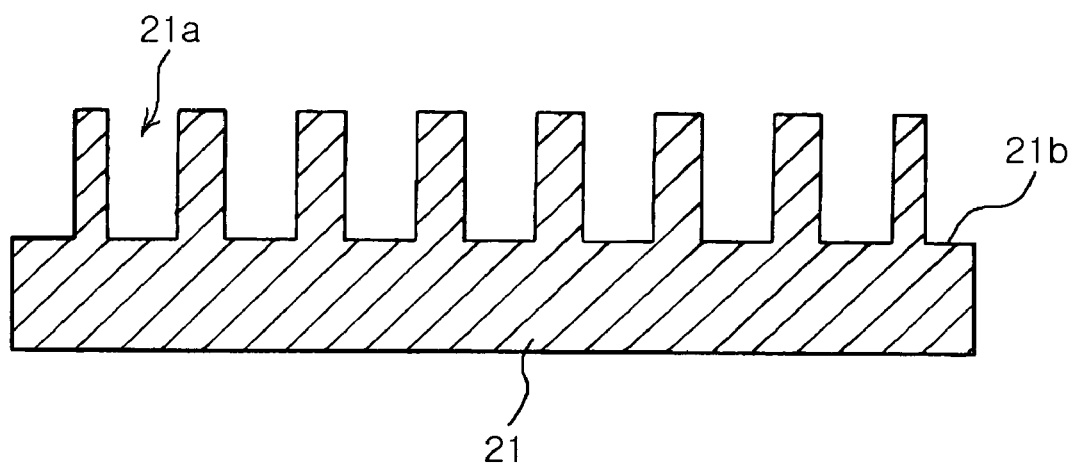
FIGS. 2A to 2F are sectional views illustrating a process of manufacturing a capacitor layer according to a preferred embodiment of the present invention.

As shown in FIG. 2A, a method of manufacturing a thin film type multi-layered ceramic capacitor according to the present invention begins with the step of forming a plurality of holes 21a on a substrate 21. The plurality of holes 21a are formed on the substrate 21 to increase the surface area of the upper surface of the substrate 21. The holes 21 may have various different shapes, and may be easily formed through the use of a selective etching process, which is used in a semiconductor process. For example, the holes 21a may be hemispherical grains, pin-type holes, or cylinders. In this embodiment of the present invention, the holes 21a are formed in the shape of cylinders having the same depth through the used of anisotropic etching. Also, each of the holes 21a is formed such that each of the holes 21a has an aspect ratio of one or more so as to sufficiently increase the surface area. The aspect ratio of each of the holes 21 is preferably 50 or less so as to ensure uniform coating at the inner surfaces of the holes 21a.

As shown in FIG. 2a, the substrate 21 may be provided at both sides thereof with step parts 21b. The step parts 21b may be formed simultaneously with the holes 21a through the selective etching process used in the hole forming step. In this case, the step parts 21b are formed at the same height as the bottom surfaces of the holes 21a. In this embodiment of the present invention, the substrate 21 is a silicon substrate commonly used in the semiconductor process, although any nonconductive substrate that can be processed by means of the semiconductor process may be used for the present invention.

Figure 2B:
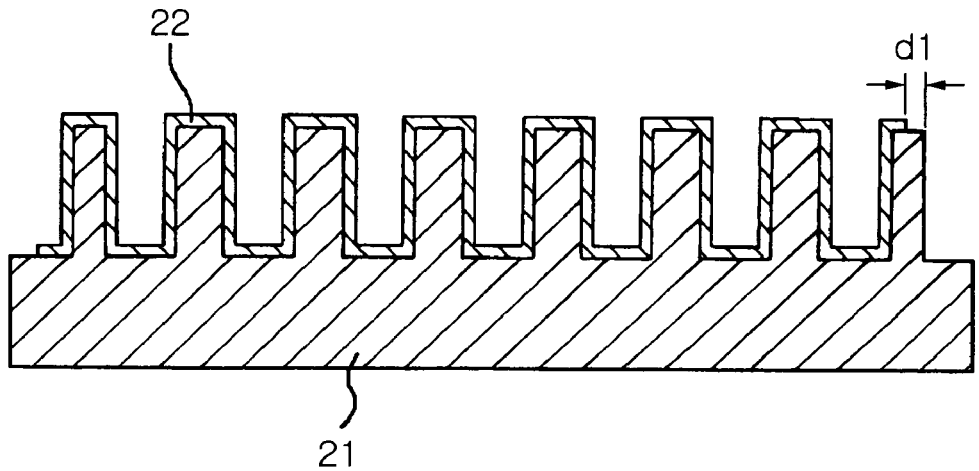

Subsequently, a lower electrode film 22 is formed on the upper surface of the substrate as shown in FIG. 2B. The lower electrode film 22 extends to one side of the substrate 21. This process of forming the lower electrode film 21 may be carried out by means of an ordinary semiconductor film forming process, such as chemical vapor deposition (CVD) including metal organic chemical vapor deposition (MOCVD) or atomic layer deposition (ALD).

This deposition process provides excellent step coating efficiency. Consequently, the lower electrode film 22 can be deposited at the inner surface of the plurality of holes 21a with desired uniform thickness. As shown in FIG. 2B, the lower electrode film 22 is formed on the upper surface of the substrate including the inner surface of the holes 21a and at one side of the substrate 21, but the lower electrode film 22 is not formed at the other side of the substrate 21, by which external electrodes 38a and 39b (See FIGS. 3A to 3C) formed at both sides of the substrate 21 are prevented from being undesirably shorted.

The lower electrode film 22 may be formed through the use of a process for depositing an electrode material on the upper surface of the substrate 21 and at the both sides of the substrate 21 and a process for etching the other side of the substrate 21. Preferably, the lower electrode film 22 is further removed from the upper surface section d1 adjacent to the other side of the substrate 21 through the use of the etching process as shown in FIG. 2b. Consequently, the lower electrode film 22 is effectively prevented from being shorted with an upper electrode film 26 (See FIG. 2D), which will be subsequently grown.

The material used for the lower electrode film 22 may be at least one metal selected from the group consisting of Pt, Ru, Ir, Au, Ni, Mo, W, Al, Ta and Ti, or a conductive oxide or nitride including the metal, although the present invention is not limited to the above-mentioned materials.

Figure 2C:
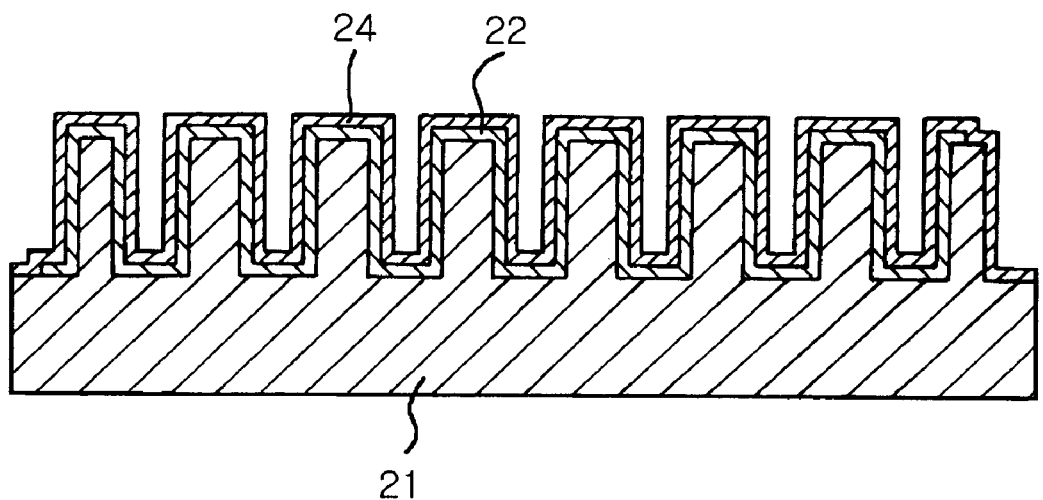

Subsequently, a dielectric film 24 is formed on the lower electrode film 22 disposed at the upper surface of the substrate 21 as shown in FIG. 2C. This process may be carried out by means of ordinary semiconductor film forming processes, such as chemical vapor deposition (CVD) or atomic layer deposition (ALD), as in the forming process of the lower electrode film 22. A dielectric material is deposited on the upper surface of the lower electrode film 22, and then the dielectric material deposited at the side of the substrate 21 is partially removed by means of etching. In this way, the dielectric film 24 is obtained. In this process, the surface area of the dielectric film 24 formed on the upper surface of the substrate 21 is an effective surface area, which decides the final electrostatic capacity.

The material used for the dielectric film 24 may be a high dielectric material selected from the group consisting of $TiO_2$, $ZrO_2$, $HfO_2$, $SrTiO_3$, $BaTiO_3$, $(Ba,Sr)TiO_3$, $PbTiO_3$ and $Pb(Zr,Ti)O_3$, or a conductive oxide or nitride including the metal, although the present invention is not limited to the above-mentioned materials.

Figure 2D:
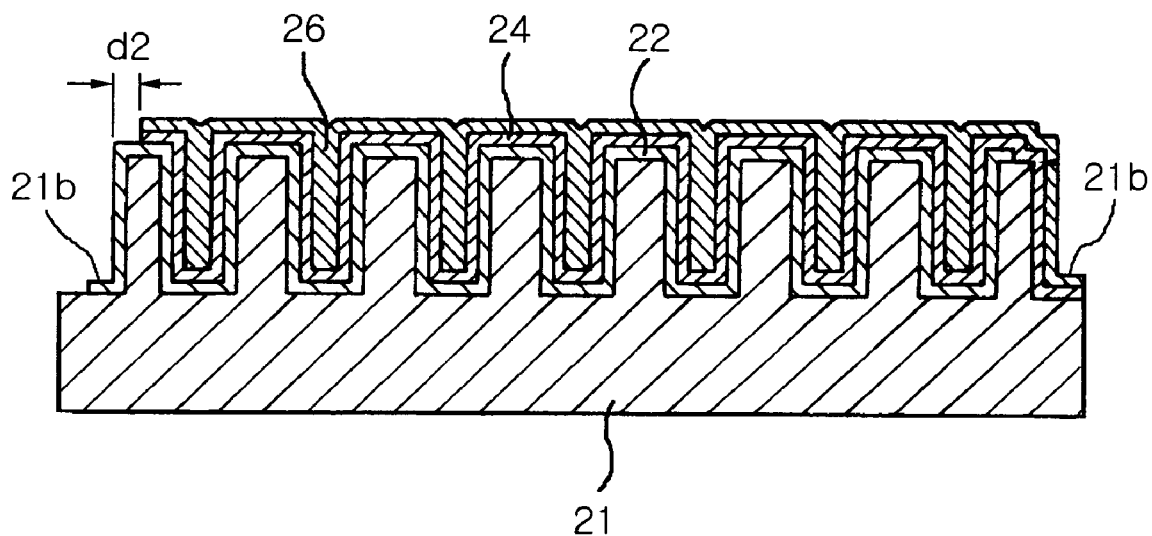

Subsequently, an upper electrode film 26 is formed on the upper surface of the dielectric film 24 while extending to the other side of the substrate 21, as shown in FIG. 2D, to obtain a thin film capacitor. This process for forming the upper electrode film 26 may be carried out by means of ordinary semiconductor film forming processes, such as chemical vapor deposition (CVD) including metal organic chemical vapor deposition (MOCVD) or atomic layer deposition (ALD), as in the forming process of the lower electrode film 22. The material used for the upper electrode film 26 may be at least one metal selected from the group consisting of Pt, Ru, Ir, Au, Ni, Mo, W, Al, Ta and Ti, or a conductive oxide or nitride including the metal, although the present invention is not limited to the above-mentioned materials.

The upper electrode film 26 is formed on the upper surface of the dielectric film 24 such that the upper electrode film 26 extends to the other side of the substrate 21. As a result, the upper electrode film 26 is not formed at one side of the substrate 21 where the lower electrode film 22 is formed. Consequently, the upper electrode film 26 and the lower electrode film 22 can be separately connected to external electrodes, which will be formed at both sides of the substrate 21.

The upper electrode film 26 may be formed through the use of a process for depositing an electrode material and a selective etching process, as in the lower electrode film 22. Preferably, the upper electrode film 26 is further removed from a upper surface section d2 adjacent to one side of the substrate 21 through the use of the etching process as shown in FIG. 2D. Consequently, the upper electrode film 26 is effectively prevented from being shorted with the lower electrode film 22.

Figure 2E:
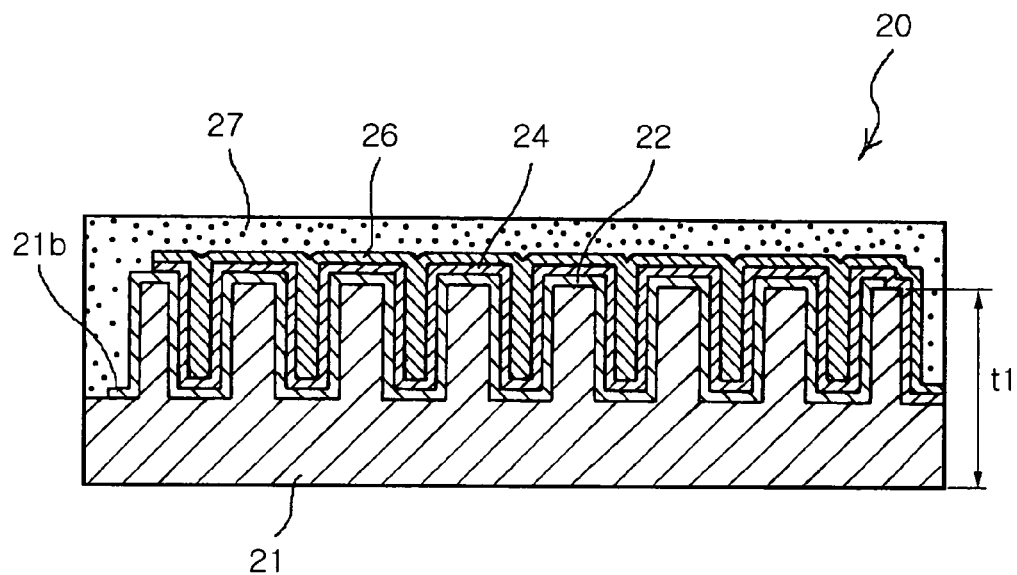
Figure 2F:
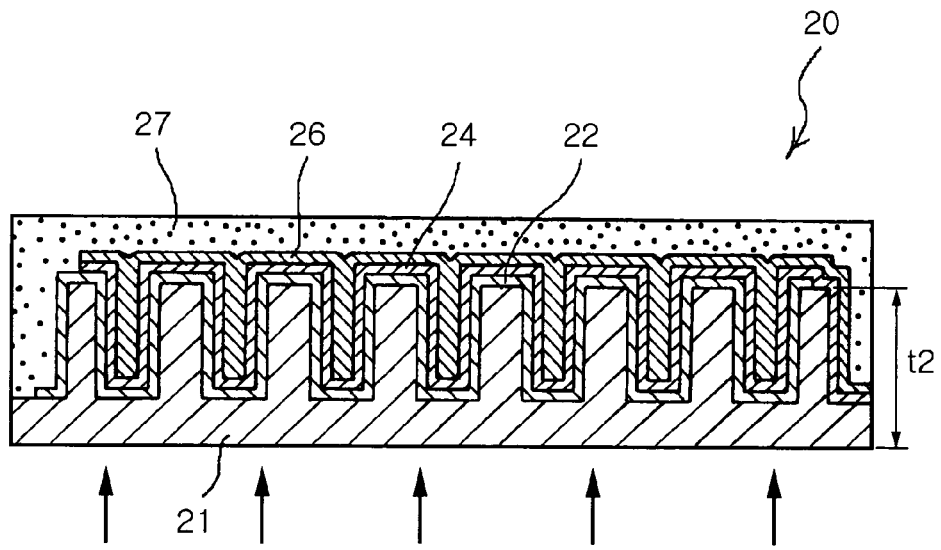

A capacitor layer 20, which includes the substrate 21 having the plurality of holes formed thereon and the thin film capacitor formed on the upper surface of the substrate 21, is manufactured through the use of the above-mentioned processes. The capacitor layer 20 may be further processed by means of a passivation layer forming process and a grinding process, which can be selectively used as necessary. FIGS. 2E and 2F show the passivation layer formed process and the grinding process, which can be further adopted in the preferred embodiment of the present invention.

As shown in FIG. 2E, a passivation layer 27 is formed on the upper surface of the capacitor layer 20 such that the upper surface of the capacitor layer 20 can be flattened. The passivation layer 27 may be made of an oxide, such as $SiO_2$, and a nitride, such as $Si_3N_4$, as in a common protection layer. In the embodiment of the present invention, the passivation layer is adopted to further flatten the upper surface of the capacitor layer 20.

If the plurality of holes 21 are filled through the use of the process for forming the lower electrode film 22, the process for forming the dielectric film 24, and the process for forming the upper electrode film 26 such that the upper surface of the upper electrode film 26 is flattened, the passivation layer formed process may be omitted. However, the effective surface area is increased only when the lower electrode film 22, the dielectric film 24, and the upper electrode film 26 are formed along the inner surfaces of the holes 21a. For this reason, it is not easy to flatten the upper surface of the upper electrode film 26. Consequently, it is preferable to further form the passivation layer 27 as described above so that a stacking process, which will be described below with reference to FIG. 3A, can be easily carried out.

Subsequently, the grinding process is carried out to the lower surface of the substrate 21 of the capacitor layer 20 so that the thickness of the capacitor layer 20 is decreased, as shown in FIG. 2F. The unnecessary lower part of the substrate 20 is removed through the use of the grinding process, by which the final stacked product may be more miniaturized. This grinding process is an optional process. Consequently, the grinding process may be omitted if the thickness of the capacitor layer 20 is sufficiently thin. When a relatively thick substrate is required so that the substrate can be easily handled in the above-described film forming and etching processes, it is preferable to further carry out the grinding process so that the thickness of the capacitor layer 20 is decreased.

At least two capacitor layers, which are manufactured through the use of the processes illustrated in FIGS. 2A to 2F, are stacked, and the stacked body is provided at both sides thereof with external electrodes respectively connected to the upper and lower electrode films, by which a thin film type multi-layered ceramic capacitor is obtained.

The stacking process for stacking the capacitor layers to obtain the thin film type multi-layered ceramic capacitor according to the present invention will be described hereinafter with reference to FIGS. 3a to 3c.

Figure 3A:
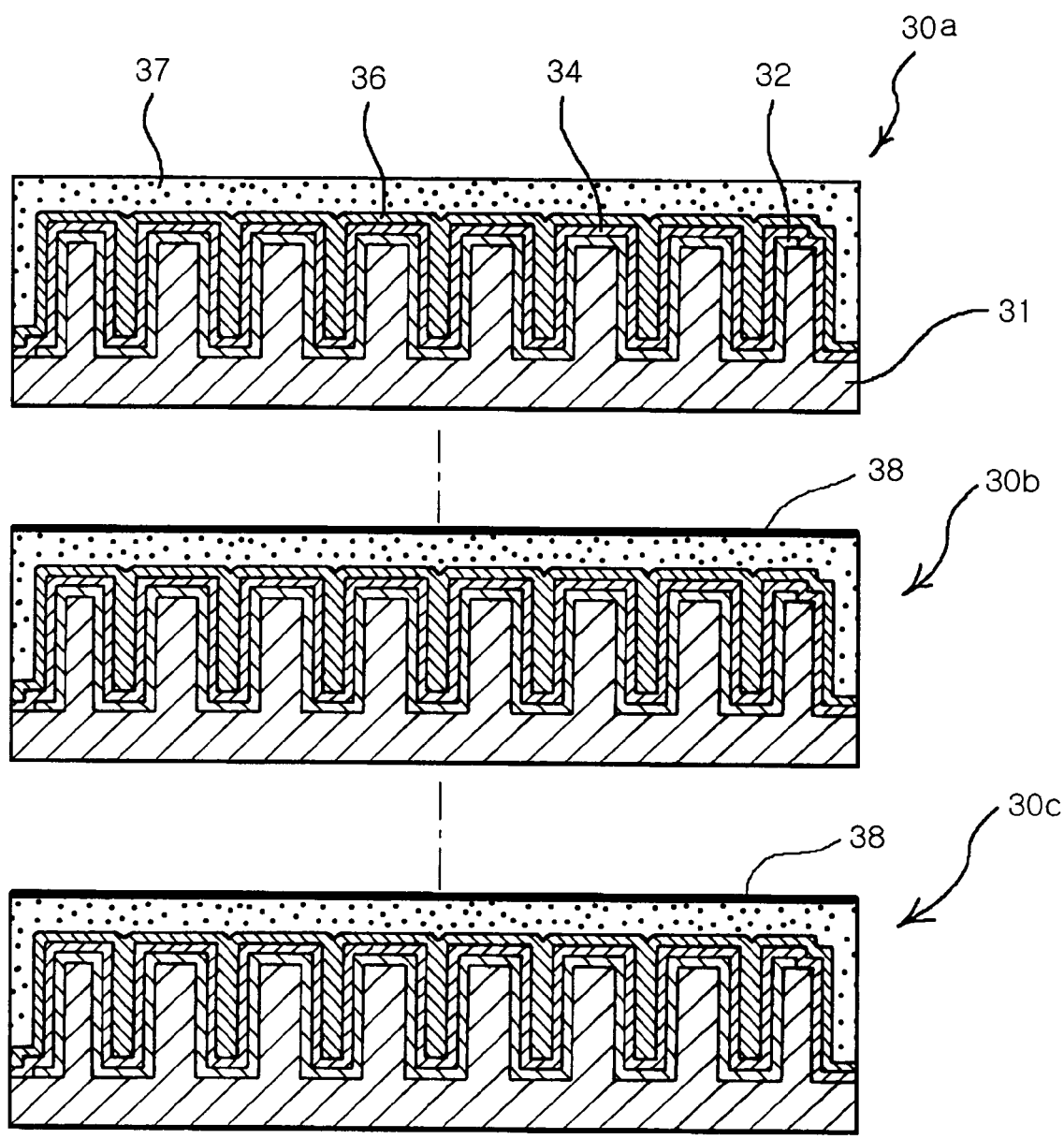
FIGS. 3A to 3C are sectional views illustrating a process of manufacturing a thin film type multi-layered ceramic capacitor through the use of the capacitor layer manufactured from the manufacturing process shown in FIGS. 2A to 2F.

First, three capacitor layers 30a, 30b, and 30c, each of which is manufactured through the use of the processes illustrated in FIGS. 2A to 2F, are prepared as shown in FIG. 3A. Before the capacitor layers 30a, 30b, and 30c are stacked, a bonding agent 38 is applied to the upper surfaces of the capacitor layers 30b and 30c, which will be in contact with the lower surfaces of the capacitor layers 30a and 30b when the stacking process is carried out, respectively. In this embodiment of the present invention, the bonding agent 38 is applied to the upper surfaces (for example, passivation layers) of the capacitor layers 30b and 30c, although the bonding agent 38 may be applied to the lower surfaces of the capacitor layers 30a and 30b, which provides the same effect as the case that the bonding agent 38 is applied to the upper surfaces of the capacitor layers 30b and 30c. The bonding agent 38 may be a bonding agent made of an insulating resin. Preferably, the bonding agent 38 may be a thermo-hardening bonding agent, an ultraviolet-hardening bonding agent, and the composite thereof. It is necessary that the thermo-hardening bonding agent stably hold its bonding performance at common soldering temperatures. In this embodiment of the present invention, three capacitor layers are prepared, although two or more than three capacitors may be used on the basis of the required electrostatic capacity and the allowable size of the product.

Figure 3B:
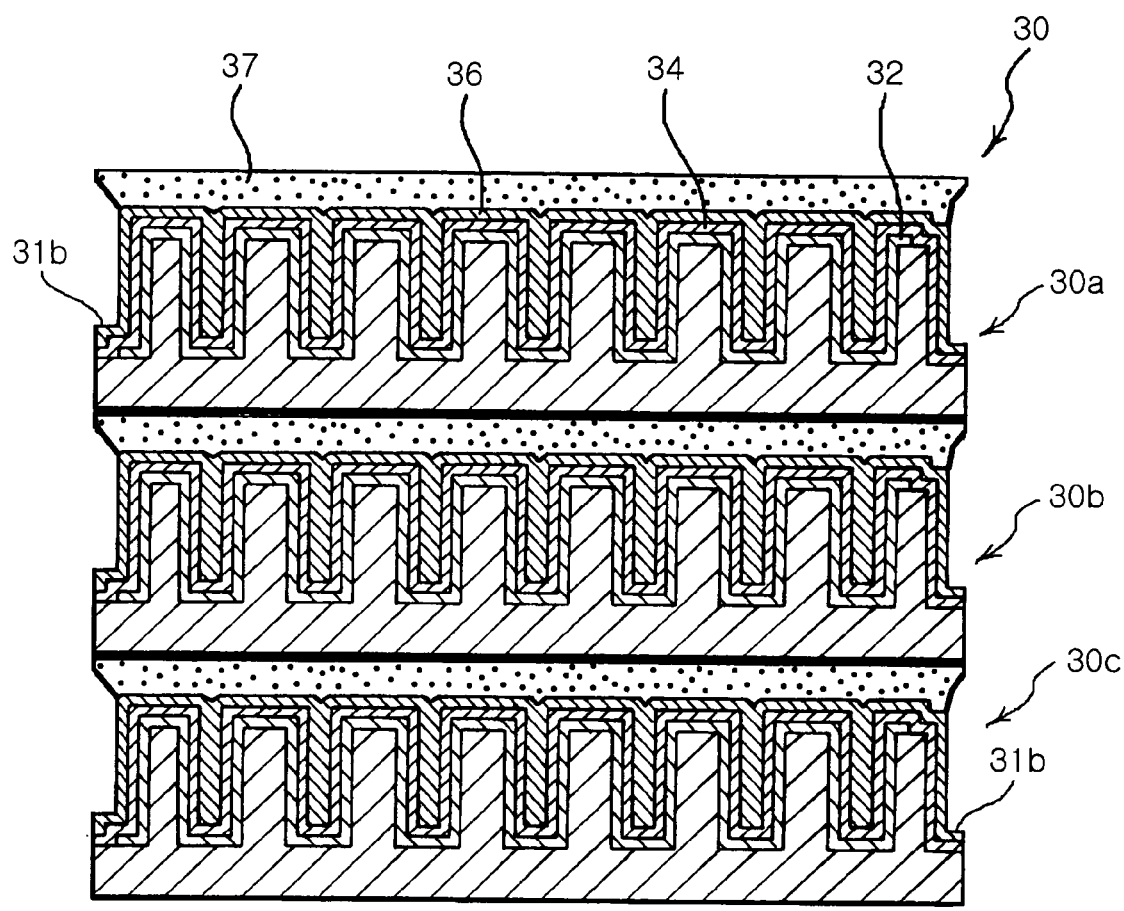

Subsequently, the three capacitor layers 30a, 30b, and 30c are stacked, while the boding agent 38 is applied to the upper surfaces of the capacitor layers 30b and 30c, to form a stacked body, and the passivation layers 37 are etched such that upper and lower electrode films 36 and 32 disposed at both sides of the stacked body are exposed, as shown in FIG. 3B. The stacking process may be carried out by setting a hardening condition of the bonding agent 39 (for example, heating and/or ultraviolet irradiation) while a predetermined pressure is maintained. The passivation layers 37 disposed at the sides of the stacked body are removed to expose the, upper and lower electrode films 36 and 32. When the passivation layers 38 are not formed because the upper surfaces of the upper electrode films 36 are sufficiently flat, the process for removing the passivation layers 38 may be omitted as described above.

Figure 3C:
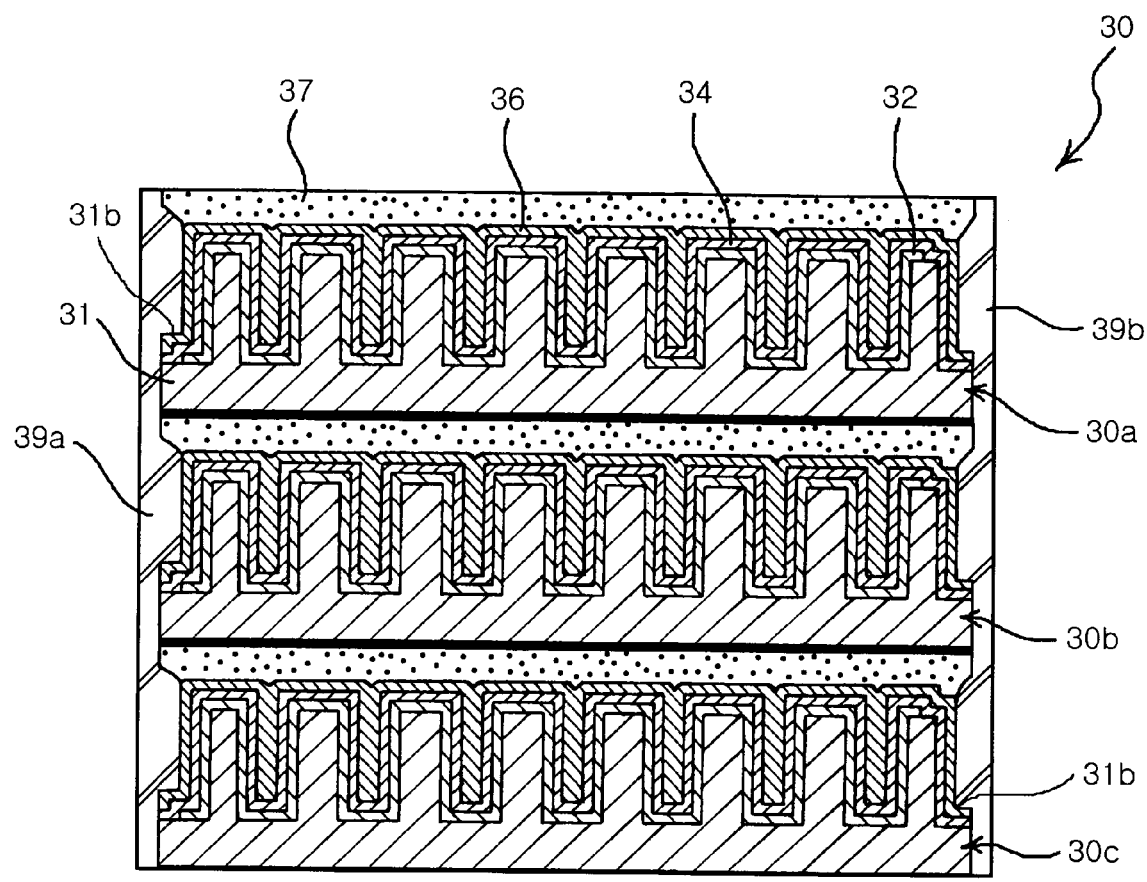

Finally, external electrodes 39a and 39b are formed at the upper and lower electrode films 36 and 32 exposed from the sides of the stacked body to obtain a thin film type multi-layered ceramic capacitor 30, as shown in FIG. 3C. The process for forming the external electrodes may be carried out through the use of well-known electrode forming processes, such as a depositing process, a plating process, and a printing process. The material for the external electrodes 39a and 39b may be Au, Pd, Ni, Ag, or their alloy, which is well known. The thin film capacitors formed at the respective capacitor layers 30a, 30b, and 30c are connected in parallel with each other by means of the external electrodes 39a and 39b, by which a multi-layered structure is accomplished. The external electrodes 39a and 39b may be more firmly attached to the sides of the stacked body by means of the step parts 31b, each of which is previously prepared as described with reference to FIG. 2A.

In this embodiment of the present invention, the bonding agent 39 is used to stack the capacitor layers, although the stacked body may be obtained through the use of a well-known pressure heating process as is appreciated by those skilled in the art. More specifically, the stacked capacitor layers are heated at high temperature, which is below the temperature at which the dielectric film 34 is deteriorated, and are then pressed at high pressure, whereby the stacked body as shown in FIG. 3B is formed without using the bonding agent 38.

A method of manufacturing a thin film type multi-layered ceramic capacitor may be carried out at the wafer level. The capacitor layers, each of which is formed at the wafer level, are stacked and cut by predetermined sizes, which is very suitable to mass production. A method of manufacturing a thin film type multi-layered ceramic capacitor at the wafer level is shown in FIGS. 4A to 4D.

Figure 4A:
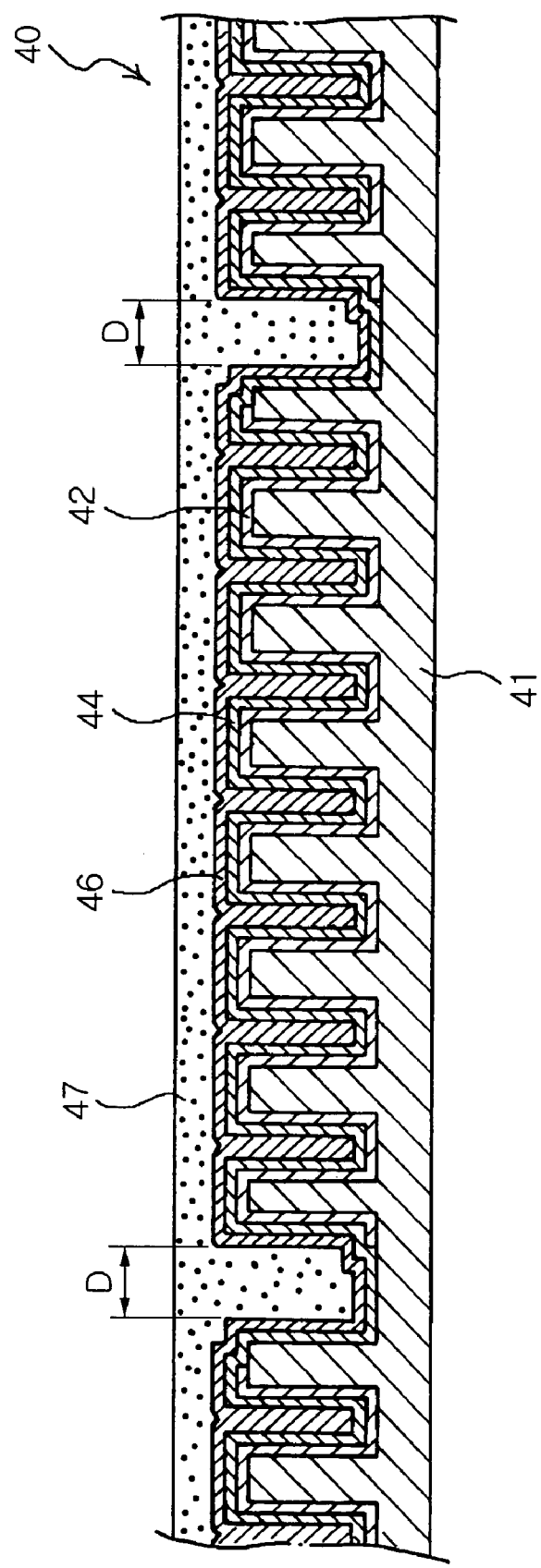
FIG. 4A is a side view, in section, showing a capacitor layer manufactured at the wafer level according to another preferred embodiment of the present invention.
Figure 4B:
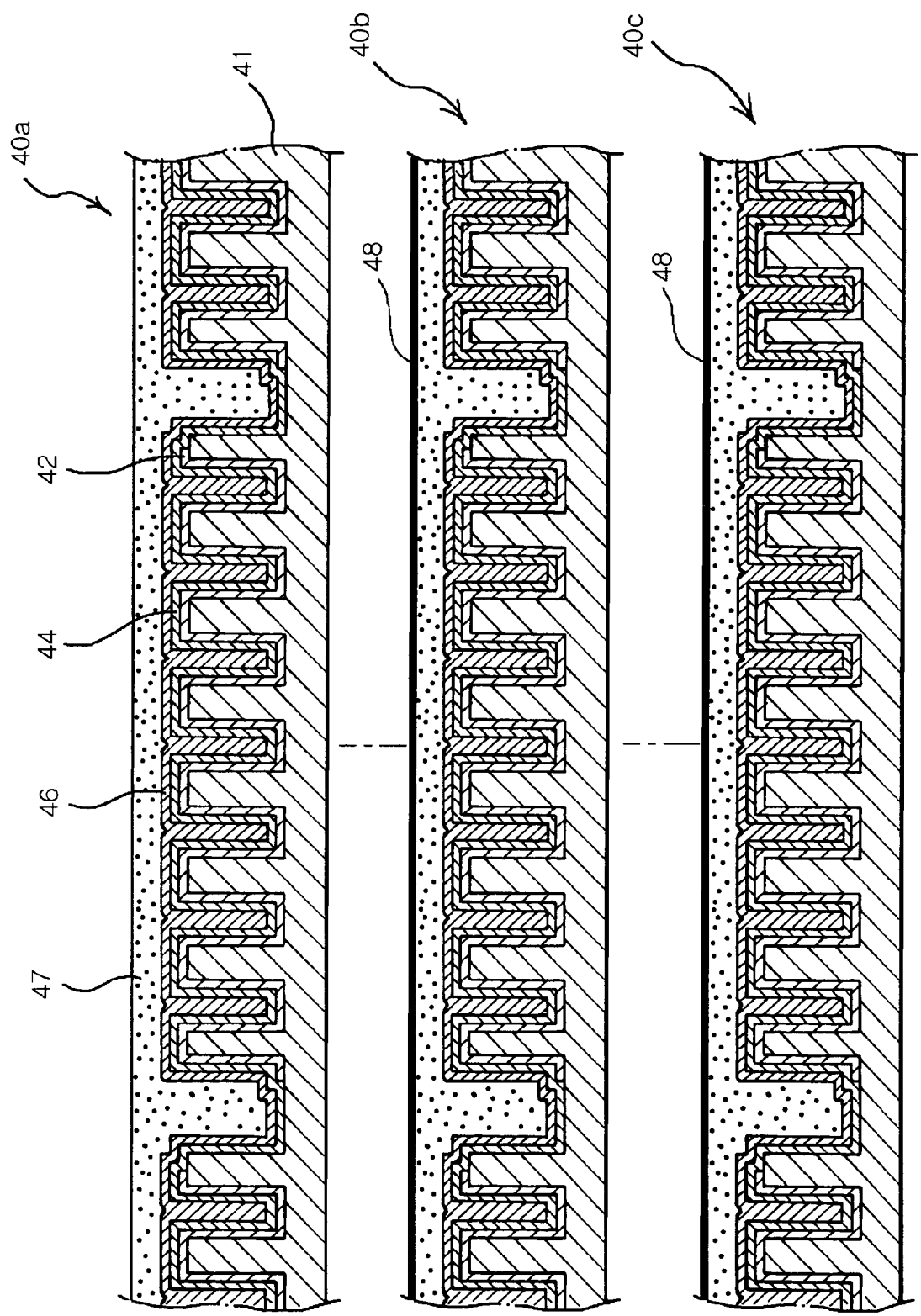
FIGS. 4B to 4D are sectional views illustrating a process of manufacturing a thin film type multi-layered ceramic capacitor through the use of the wafer shown in FIG. 4A.
Figure 4C:
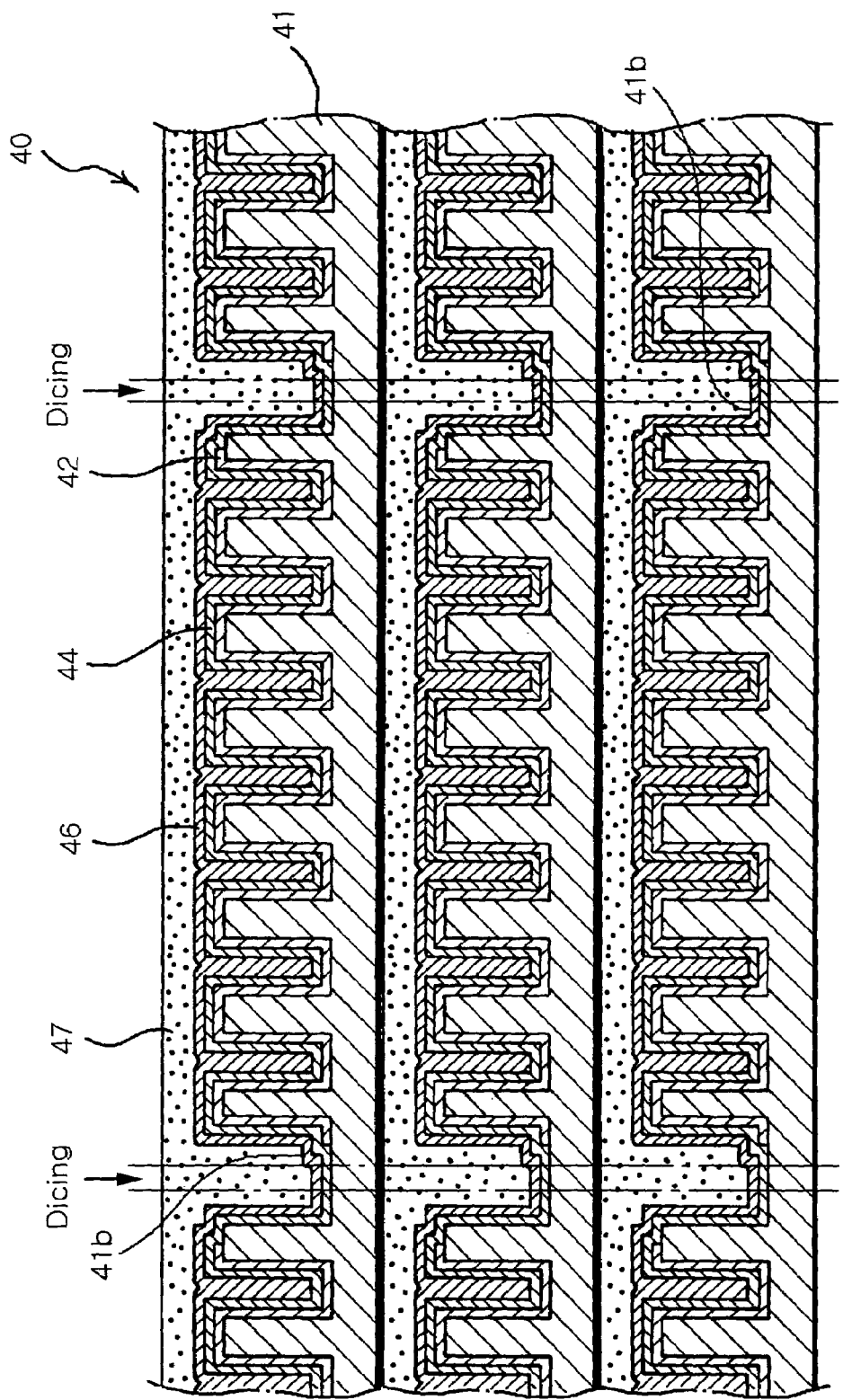
Figure 4D:
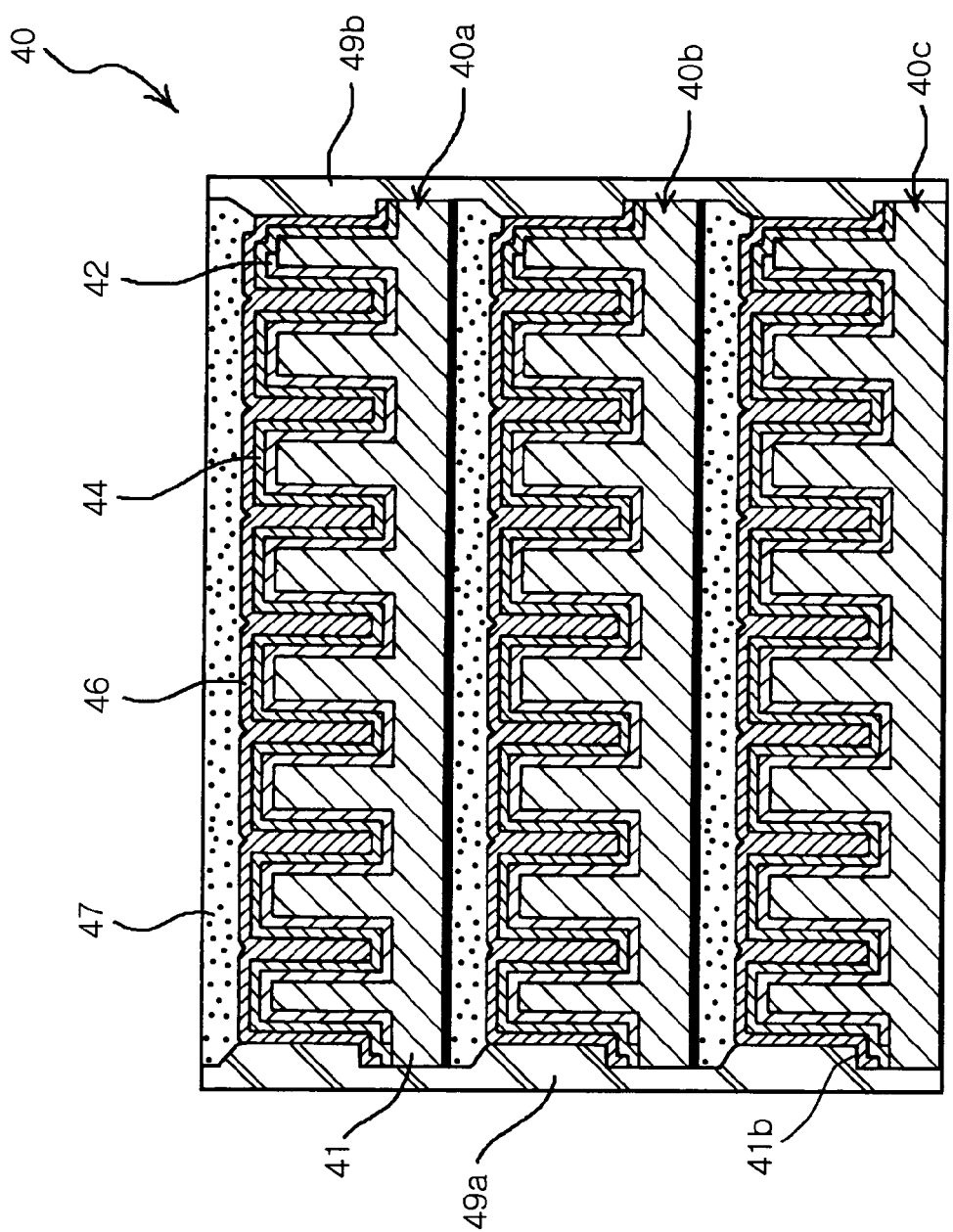

FIG. 4A is a side view, in section, showing a capacitor layer manufactured at the wafer level according to another preferred embodiment of the present invention, and FIGS. 4B to 4D are sectional views illustrating a process of manufacturing a thin film type multi-layered ceramic capacitor through the use of the wafer shown in FIG. 4A.

First, a plurality of capacitor layers are formed on a wafer 41 as shown in FIG. 4A. The process for manufacturing the wafer-level capacitor layers may be carried out similarly to the processes described with reference to FIGS. 2A to 2F. In this embodiment of the present invention, however, separation parts having a width of D are formed between the capacitor layers. The separation parts have the same depth as the holes. Also, at least two wafers 41 each having the plurality of capacitor layers as shown in FIG. 4A are manufactured through the use of separated wafer-level processes (three wafers are prepared in this embodiment of the present invention). The wafers 40a, 40b, and 40c (See FIG. 4B), which form the respective layers, have the same size, and at least two capacitor layers are arranged in the same pattern for each wafer.

Subsequently, the three wafers 40a, 40b, and 40c are stacked through the use of bonding means, such as a bonding agent 48, as shown in FIG. 4B. The bonding agent 48 may be a thermo-hardening bonding agent, an ultraviolet-hardening bonding agent, and the composite thereof, as described above. The bonding agent 48 may be applied to the upper or lower surface of each wafer (the upper surface of a passivation layer 47 or the lower surface of the wafer 41 in this embodiment of the present invention). Alternatively, the stacked wafers may be bonded to each other by means of a pressing process using high temperature/high pressure.

Subsequently, a stacked body comprising the plurality of wafers 40a, 40b, and 40c, which is formed through the use of the above-described stacking process, is cut to obtain a plurality of thin film type multi-layered ceramic capacitor bodies. The cutting operation is carried out at the respective middles of the separation parts formed simultaneously when the holes are formed. As a result, step parts 41b are provided at both sides of each of the separated thin film type multi-layered ceramic capacitor bodies. External electrodes, which will be subsequently formed, may be more firmly attached to the sides the separated thin film type multi-layered ceramic capacitor bodies by means of the step parts 41b, as described above. In this way, the plurality of thin film type multi-layered ceramic capacitor bodies, which are obtained through the use of the wafer level process, can be manufactured in large quantities through the use of the cutting process.

Finally, the passivation layers 47 are etched such that upper and lower electrode films 46 and 42 disposed at both sides of the stacked body are exposed, and external electrodes 49a and 49b, which are connected to the upper and lower electrode films 46 and 42, respectively, are formed at the sides of the stacked body, as shown in FIG. 4D. The thin film capacitors formed at the respective capacitor layers 40a, 40b, and 40c are connected in parallel with each other by means of the external electrodes 39a and 39b, by which a multi-layered structure is accomplished as shown in FIG. 4D. The process for forming the external electrodes may be carried out by means of well-known methods using well-known electrode materials, such as Au, Pd, Ni, Ag, or their alloy.

As apparent from the above description, the present invention provides a thin film type multi-layered ceramic capacitor that is manufactured by stacking a plurality of thin film capacitors with effective surface area increased through a plurality of holes and connecting the stacked thin film capacitors in parallel, whereby the thin film type multi-layered ceramic capacitor is miniaturized with high electrostatic capacity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A thin film type multi-layered ceramic capacitor comprising:
    a stacked body composed of a plurality of capacitor layers, each of the capacitor layers including a substrate having an upper surface where a plurality of holes are formed and a flat lower surface, and a thin film capacitor disposed on the upper surface of the substrate, the thin film capacitor having a lower electrode film, a dielectric film, and an upper electrode film, the lower electrode film, the dielectric film, and the upper electrode film being formed in sequence on the upper surface of the substrate, the lower electrode film extending to one side of the substrate, the upper electrode film extending to the other side of the substrate;
    a first external electrode formed at one side of the stacked body for contacting the lower electrode films of the respective capacitor layers; and
    a second external electrode formed at the other side of the stacked body for contacting the upper electrode films of the respective capacitor layers.

2. The capacitor as set forth in claim 1, wherein the substrate is provided at both sides thereof with step parts.

3. The capacitor as set forth in claim 1, wherein each of the capacitor layers further comprises a passivation layer formed on the upper surface of the thin film capacitor, the passivation layer having a flat upper surface.

4. The capacitor as set forth in claim 1, wherein the plurality of holes have the same depth.

5. The capacitor as set forth in claim 4, wherein the substrate is provided at both sides thereof with step parts, the step parts having the same height as the bottom surfaces of the holes.

6. The capacitor as set forth in claim 1, wherein the plurality of holes are hemispherical grains, pin-type holes, or cylinders.

7. The capacitor as set forth in claim 1, wherein each of the holes has an aspect ratio of 1 to 50.

8. The capacitor as set forth in claim 1, wherein at least one of the upper and lower electrode films is made of at least one metal selected from the group consisting of Pt, Ru, Ir, Au, Ni, Mo, W, Al, Ta and Ti.

9. The capacitor as set forth in claim 1, wherein at least one of the upper and lower electrode films is made of a conductive oxide or nitride of at least one metal selected from the group consisting of Pt, Ru, Sr, La, Ir, Au, Ni, Co, Mo, W, Al, Ta and Ti.

10. The capacitor as set forth in claim 1, wherein the dielectric film is made of a high dielectric material selected from the group consisting of $TiO_2$, $ZrO_2$, $HfO_2$, $SrTiO_3$, $BaTiO_3$, $(Ba,Sr)TiO_3$, $PbTiO_3$ and $Pb(Zr,Ti)O_3$.

11. The capacitor as set forth in claim 1, wherein the plurality of capacitor layers constituting the stacked body are bonded to each other by means of a thermo-hardening bonding agent, an ultraviolet-hardening bonding agent, and the composite thereof.

12. A method of manufacturing a thin film type multi-layered ceramic capacitor, the method comprising the steps of:
forming a plurality of capacitor layers, each of the capacitor layers including a substrate having an upper surface where a plurality of holes are formed and a flat lower surface, a thin film capacitor disposed on the upper surface of the substrate, the thin film capacitor comprising a lower electrode film, a dielectric film, and an upper electrode film, the lower electrode film, the dielectric film, and the upper electrode film being formed in sequence on the upper surface of the substrate, the lower electrode film extending to one side of the substrate, the upper electrode film extending to the other side of the substrate;
stacking the plurality of capacitor layers such that the lower surface of one of the capacitor layers is bonded to the upper surface of another capacitor layer to form a stacked body; and
forming a first external electrode formed at one side of the stacked body for contacting the lower electrode films of the respective capacitor layers and a second external electrode formed at the other side of the stacked body for contacting the upper electrode films of the respective capacitor layers.

13. The method as set forth in claim 12, wherein the step of forming the plurality of capacitor layers comprises the sub-steps of:
preparing a substrate having upper and lower surfaces;
forming a plurality of holes on the substrate to increase the surface area of the upper surface of the substrate;
forming a lower electrode film on the upper surface of the substrate including the inner surfaces of the plurality of holes, the lower electrode film extending to one side of the substrate;
forming a dielectric film on the lower electrode film disposed on the upper surface of the substrate; and
forming an upper electrode film on the upper surface of the dielectric film, the upper electrode film extending to the other side of the substrate.

14. The method as set forth in claim 13, wherein the step of forming the plurality of holes comprises the sub-step of forming the plurality of holes with the same depth.

15. The method as set forth in claim 14, wherein the step of forming the plurality of holes comprises the sub-step of forming step parts having the same height as the bottom surfaces of the holes at both sides of the substrate.

16. The method as set forth in claim 13, wherein the plurality of holes are hemispherical grains, pin-type holes, or cylinders.

17. The method as set forth in claim 13, wherein each of the holes has an aspect ratio of 1 to 50.

18. The method as set forth in claim 12, wherein the step of forming the lower electrode film comprises the sub-steps of:
depositing an electrode material on the upper surface of the substrate and at the both sides of the substrate; and
etching the electrode material deposited at the other side of the substrate and on the upper surface of the substrate adjacent to the other side of the substrate to form the lower electrode film.

19. The method as set forth in claim 12, wherein the step of forming the upper electrode film comprises the sub-steps of:
depositing an electrode material on the upper surface of the substrate where the dielectric film is formed and at the both sides of the substrate; and
removing the electrode material deposited at one side of the substrate and on the upper surface of the substrate adjacent to one side of the substrate to form the upper electrode film.

20. The method as set forth in claim 12, wherein the step of forming the lower electrode film and the step of forming the upper electrode film are carried out by means of chemical vapor deposition (CVD) or atomic layer deposition (ALD).

21. The method as set forth in claim 12, wherein the step of forming the plurality of capacitor layers further comprises the sub-step of:
forming passivation layers on the upper surfaces of the capacitor layers, respectively, such that the upper surfaces of the capacitor layers can be flattened.

22. The method as set forth in claim 21, wherein the passivation layers are formed on the upper surfaces and sides of the plurality of capacitor layers, and the method further comprises the step of:
after the stacked body is formed and before the first and second external electrodes are formed, selectively removing the passivation layers such that the upper and lower electrode films disposed at both sides of the stacked body are exposed.

23. The method as set forth in claim 12, wherein the step of forming the plurality of capacitor layers further comprises the sub-step of grinding the lower surfaces of the substrates to decrease the thickness of the capacitor layers.

24. The method as set forth in claim 12, wherein
the step of forming the plurality of capacitor layers further comprises the sub-step of:
forming a plurality of wafers each having at least one capacitor layer formed thereon at the wafer level,
the plurality of wafers having the same size, each of the wafers having at least one capacitor layer arranged in the same pattern, and
the step of forming the stacked body comprises the sub-steps of:
stacking the plurality of wafers each having at least one capacitor layer formed thereon; and
cutting the stacked wafers to obtain at least one multi-layered ceramic capacitor body.

25. The method as set forth in claim 12, wherein at least one of the upper and lower electrode films is made of at least one metal selected from the group consisting of Pt, Ru, Ir, Au, Ni, Mo, W, Al, Ta and Ti.

26. The method as set forth in claim 12, wherein at least one of the upper and lower electrode films is made of a conductive oxide or nitride of at least one metal selected from the group consisting of Pt, Ru, Sr, La, Ir, Au, Ni, Co, Mo, W, Al, Ta and Ti.

27. The method as set forth in claim 12, wherein the dielectric film is made of a high dielectric material selected from the group consisting of $TiO_2$, $ZrO_2$, $HfO_2$, $SrTiO_3$, $BaTiO_3$, $(Ba,Sr)TiO_3$, $PbTiO_3$ and $Pb(Zr,Ti)O_3$.

28. The method as set forth in claim 12, wherein the step of forming the stacked body comprises the sub-steps of:
applying a thermo-hardening bonding agent, an ultraviolet-hardening bonding agent, and the composite thereof on the upper surfaces or the lower surfaces of the plurality of capacitor layers; and
stacking the plurality of capacitor layers.

* * * * *